United States Patent
Doettling et al.

(10) Patent No.: US 9,864,913 B2
(45) Date of Patent: Jan. 9, 2018

(54) DEVICE AND METHOD FOR SAFEGUARDING AN AUTOMATICALLY OPERATING MACHINE

(71) Applicant: PILZ GMBH & CO. KG, Ostfildern (DE)

(72) Inventors: Dietmar Doettling, Ostfildern (DE); Soeren Hader, Ostfildern (DE)

(73) Assignee: PILZ GMBH & CO. KG, Ostfildern (DE)

(*) Notice: Subject to any disclaimer, the term of this patent is extended or adjusted under 35 U.S.C. 154(b) by 145 days.

(21) Appl. No.: 14/974,428

(22) Filed: Dec. 18, 2015

(65) Prior Publication Data

US 2016/0104046 A1   Apr. 14, 2016

Related U.S. Application Data

(63) Continuation of application No. PCT/EP2014/062321, filed on Jun. 13, 2014.

(30) Foreign Application Priority Data

Jun. 21, 2013   (DE) .......................... 10 2013 106 514

(51) Int. Cl.
  *G06K 9/00*  (2006.01)
  *F16M 11/10* (2006.01)
  (Continued)

(52) U.S. Cl.
  CPC ........ *G06K 9/00771* (2013.01); *B23K 37/006* (2013.01); *F16M 11/105* (2013.01);
  (Continued)

(58) Field of Classification Search
  CPC ....................................................... G06K 9/00
  See application file for complete search history.

(56) References Cited

U.S. PATENT DOCUMENTS 5,811,055 A * 9/1998 Geiger ................. B23K 9/0061
  266/48
6,479,786 B1 * 11/2002 Fields, Jr. ............ B23K 26/032
  219/121.63
(Continued)

FOREIGN PATENT DOCUMENTS

DE  202 12 769 U1  11/2002
DE  102 51 584 A1   5/2004
(Continued)

OTHER PUBLICATIONS

International Search Report for PCT/EP2014/062321; dated Nov. 26, 2014; 3 pp.

*Primary Examiner* — Anand Bhatnagar
(74) *Attorney, Agent, or Firm* — Harness, Dickey & Pierce, P.L.C.

(57) ABSTRACT

A device for safeguarding a monitoring area in which an automatically operating machine is arranged, having a camera system for monitoring the monitoring area, a configuration unit for defining at least one protection area within the monitoring area, and an analysis unit for triggering a safety-related function. The camera system supplies camera images of the protection area and the analysis unit analyzes whether a foreign object is present in the protection area or penetrates into the protection area. The analysis unit is configured to classify a foreign object, which is present in the protection area or penetrates into the protection area, by analysis of the camera images, to determine on the basis of one or more features characteristic of welding sparks whether the foreign object is a welding spark. The analysis unit triggers the safety-related function if the foreign object has not been recognized as a welding spark.

20 Claims, 7 Drawing Sheets

(51) Int. Cl.
- *F16M 11/20* (2006.01)
- *F16M 13/02* (2006.01)
- *F16P 3/14* (2006.01)
- *H04N 5/225* (2006.01)
- *B23K 37/00* (2006.01)
- *G06K 9/62* (2006.01)
- *G06T 7/00* (2017.01)
- *H04N 13/02* (2006.01)

(52) U.S. Cl.
CPC ..... *F16M 11/2014* (2013.01); *F16M 11/2021* (2013.01); *F16M 13/02* (2013.01); *F16P 3/142* (2013.01); *G06K 9/6212* (2013.01); *G06T 7/0008* (2013.01); *H04N 5/2251* (2013.01); *H04N 13/0217* (2013.01); *H04N 13/0239* (2013.01); *G06T 2207/10021* (2013.01); *G06T 2207/30164* (2013.01); *G06T 2207/30232* (2013.01)

(56) References Cited

U.S. PATENT DOCUMENTS

| | | | | |
|---|---|---|---|---|
| 6,778,092 | B2* | 8/2004 | Braune | F16P 3/144 250/221 |
| 6,903,357 | B2* | 6/2005 | Robb | F02D 35/022 250/554 |
| 7,412,861 | B2* | 8/2008 | Lohmann | G01S 17/026 192/129 A |
| 7,567,272 | B2* | 7/2009 | Lohmann | B25J 9/1674 348/155 |
| 7,729,511 | B2* | 6/2010 | Wohler | B25J 9/1674 340/508 |
| 9,498,013 | B2* | 11/2016 | Handshaw | A42B 3/046 |
| 9,589,481 | B2* | 3/2017 | Becker | G09B 19/24 |
| 2003/0076224 | A1* | 4/2003 | Braune | F16P 3/144 340/500 |
| 2004/0079905 | A1* | 4/2004 | Robb | F02D 35/022 250/554 |
| 2004/0125206 | A1 | 7/2004 | Lohmann | |
| 2005/0207618 | A1* | 9/2005 | Wohler | B25J 9/1674 382/103 |
| 2005/0265596 | A1 | 12/2005 | Lohmann | |
| 2014/0184793 | A1* | 7/2014 | Cole | G06K 9/00771 348/143 |
| 2015/0154884 | A1* | 6/2015 | Salsich | G09B 19/24 434/234 |
| 2015/0375323 | A1* | 12/2015 | Becker | B23K 9/0953 700/160 |

FOREIGN PATENT DOCUMENTS

| | | |
|---|---|---|
| DE | 10 2009 034 848 A1 | 2/2011 |
| EP | 0 902 402 A2 | 3/1999 |
| EP | 1 306 603 A2 | 5/2003 |
| EP | 1 548 351 A2 | 6/2005 |
| EP | 1 543 270 B1 | 8/2006 |

\* cited by examiner

DEVICE AND METHOD FOR SAFEGUARDING AN AUTOMATICALLY OPERATING MACHINE

CROSS-REFERENCES TO RELATED APPLICATIONS

This application is a continuation of international patent application PCT/EP2014/062321, filed on Jun. 13, 2014 designating the U.S., which international patent application has been published in German language and claims priority from German patent application DE 10 2013 106 514.7, filed on Jun. 21, 2013. The entire contents of these priority applications are incorporated herein by reference.

BACKGROUND OF THE DISCLOSURE

This disclosure relates to a device for safeguarding a monitoring area in which an automatically operating machine is arranged, having a camera system for monitoring the monitoring area, a configuration unit for defining at least one protection area within the monitoring area, and an analysis unit for triggering a safety-related function.

The disclosure furthermore relates to a corresponding method and computer program for safeguarding a monitoring area in which an automatically operating machine is arranged.

In the case of modern industrial robots, which move at significant speeds, collisions generally result in severe damage, both to the robots and also to the workpieces handled thereby. This can result in costly production outages. The safety of persons who interact with the automatically operating robots also has the highest priority. In the case of modern industrial robots and other machines having moving machine elements, the movement of which represents a hazard to persons and other objects, a collision between the moving machine elements and a foreign object therefore has to be prevented by protection units. For this purpose, it is usually sufficient to bring the machine to a standstill before an undesired contact occurs.

Traditionally, hazardous areas around automatically operating machines are safeguarded using mechanical barriers in the form of protective fences and protective doors or with the aid of light barriers, light grids, and laser scanners. The light barriers, light grids, and laser scanners are frequently also used in combination with the first-mentioned mechanical barriers. As soon as a person opens a protective door or interrupts a light grid or a light barrier, a shutdown signal is generated, and the hazardous operating movement of the machine is stopped, or the machine is brought into a safe state. However, the installation of such protective units is quite complex and the protective units require a large amount of space around a hazardous machine. In addition, such protective units are less flexible when it is important to adapt the safeguarding of the hazardous operating area to different operating situations of the machine.

In particular in the case of optoelectronic sensors, such as light grids, light barriers, or reflected light sensors, undesired shutdowns of the machines or facilities can occur. Extremely small parts or interfering lights, which would actually be harmless with regard to safety technology, nonetheless can trigger the shutdown signal. This frequently results in unnecessary restrictions of the machine and facility availability, since a shutdown also takes place in situations which are harmless from a safety-technology viewpoint. Attempts have therefore been made to filter out interfering objects and interfering lights in the case of light grids, light barriers, or reflected light sensors. One known technology is that the light emitter emits bit-coded light signals, which are decoded by the receiver and compared to target values. In the case of reflected light sensors, inter alia, polarized light is used. Even mirrors or bright objects are thus still detected as a beam interruption.

A further known technology is known from DE 202 12 769 U1. DE 202 12 769 U1 discloses a light grid, which analyzes a predefined number of multiple scanning cycles with respect to the occurrence of beam interruptions of beam axes to generate an object determination signal. This is used to suppress transient interference. Smaller, irrelevant interfering objects such as insects, pollen dust, woodchips, and sawdust can be suppressed by so-called multiple analyses. This corresponds to a time filter, which tolerates an interruption of the protection area or parts thereof for a defined time, since it is presumed that interfering objects only occur temporarily. It is disadvantageous in this case that "real" infringements are also not detected in this time, i.e., in fact this results in lengthening of the reaction time and therefore in greater safety distances. In addition, this is made more difficult in that interfering objects not only appear temporarily, but rather are certainly also present for a longer time. In this case, the time filter does not help, so that the optoelectronic sensor would nonetheless recognize an infringement and accordingly generate a shutdown signal.

To avoid the above-mentioned disadvantages, efforts have been made for some time to implement the safeguard of the hazardous operating area of an automatically operating machine with the aid of camera systems and suitable image processing. Such a system is sold by the applicant under the name "SafetyEYE". It is a characteristic of such camera systems that, in contrast to normal cameras, even if a malfunction occurs, a secure state of the machine or facility which causes hazard has to be ensured. The use of camera systems also has the advantage that volumes instead of individual lines or surfaces can be safeguarded. Such camera systems specifically enable three-dimensional protection areas to be virtually monitored from all sides. It is therefore possible to again increase the safety and to monitor continuously.

EP 1 543 270 B1 describes such a system having at least two cameras, which cyclically supply images of the hazardous operating area. The images of the cameras are analyzed using at least two algorithmically different methods, wherein the hazardous operating movement of the machine is stopped or is brought into a safe state if at least one of the two methods supplies a foreign object detection in a previously defined protection area. Each of the two analysis methods generates items of 3D information from the images of the cameras, so that the position of objects in the defined protection area can be established with the aid of the method. A significant demand on such methods and devices is that the image processing, which is complex in any case, has to be implemented so it is failsafe in the meaning of relevant standards for machine safety, in particular EN ISO 13849-1, IEC 61508, EN ISO 13855, and IEC 61496, so that such a device can actually also be used for safeguarding a hazardous machine. A failure of the device itself cannot have the result that the safeguard of the machine is lost. Failsafe in this meaning is therefore considered to be a device which reaches at least SIL 2 according to IEC 61508 and/or performance level PL (d) according to EN ISO 13849. The method known from EP 1 543 270 B1 and a corresponding device can provide this and have already proven themselves in practical uses.

In the last-mentioned camera-based security systems, virtual protection areas are usually defined around the machine. The camera system detects whether a foreign object penetrates into such a protection area and thereupon turns off the machine or the facility, or brings it into a secure state. The problem nonetheless also exists in these systems that the movement of the machine or facility which causes danger is sometimes stopped without an apparent reason, which results in a shutdown of the production facilities and in production breakdowns. This can be because of extremely small parts, for example, which penetrate into the virtual protection areas, are detected as foreign objects, and therefore trigger the safety-related function. This is not desirable in particular in the case of very short cycle times and long interlinked production lines, which are to be found in particular in the automotive industry.

DE 102 51 584 A1 proposes such a camera-based safety system and associated method, in which the safety is to be increased by optimized image processing. For object acquisition, image features of current camera images are compared to a reference image feature of a stored reference background. The mentioned reference background has to be referenced in this system in a learning phase or a so-called teach-in procedure. According to the proposed method, a valid reference background is only provided if, upon the check of the reference background in both computer units, it is obtained in correspondence as a result that no adjacent zones having the same reference image feature are present within the reference background. This teach-in procedure can therefore be relatively boring and cumbersome. During the subsequent image acquisition of the protection area, the image features of the camera images are differentiated into safety-critical and non-safety-critical objects. The safety-critical objects include the operators, preferably the arms of an operator. Non-safety-critical objects are formed, for example, by static objects in the surroundings of the machine or facility, in particular also the parts to be processed thereby. If the comparison of the image features to the reference background does not result in a corresponding result, the operating means is also taken out of operation for safety reasons, since it cannot be precluded in this case that a safety-critical object is located in the protection zone. Extremely small parts which could be noncritical, but are not imaged in the reference background, would thus also result in an undesired shutdown of the machine or facility in the case of this system. The above-described problem of undesired restrictions of the machine or facility availability is thus also only partially solved by this method.

SUMMARY OF THE INVENTION

It is an object to provide a device and a method of the type mentioned in the beginning, which generate fewer undesired shutdowns in comparison to the prior art, and therefore contribute to increasing the machine and facility availability, but nonetheless ensure the security from errors required for such applications.

According to a first aspect of the present disclosure, a device is presented for safeguarding a monitoring area in which an automatically operating machine is arranged. The device comprises: a camera system for monitoring the monitoring area, a configuration unit for defining at least one protection area within the monitoring area, and an analysis unit for triggering a safety-related function. The camera system is configured to generate camera images of the protection area. The analysis unit is configured to analyze the generated camera images to determine whether a foreign object is present in the protection area or about to penetrate into the protection area, wherein, if such a foreign object is determined to be present in the protection area or about to penetrate into the protection area, the analysis unit classifies said foreign object based on the generated camera images, so as to determine on the basis of one or more features characteristic for welding sparks whether the foreign object is a welding spark. Still further, the analysis unit is configured to trigger the safety-related function if the foreign object has not been recognized as a welding spark.

According to a second aspect of the present disclosure, a method is presented for safeguarding a monitoring area in which an automatically operating machine is arranged. Said method comprises the following steps:
monitoring the monitoring area using a camera system,
defining at least one protection area within the monitoring area,
analyzing camera images provided by the camera system of the protection area to detect whether a foreign object is present in the protection area or penetrates into the protection area,
classifying the foreign object based on the camera images if such a foreign object is determined to be present in the protection area or about to penetrate into the protection area, so as to determine on the basis of one or more features characteristic of welding sparks whether the foreign object is a welding spark,
triggering a safety-related function if the foreign object has not been recognized as a welding spark.

According to a third aspect of the present disclosure, a computer program is presented for safeguarding a monitoring area in which an automatically operating machine is arranged. the computer program comprising program code means which, when executed on a computer, carry out the following steps:
controlling a camera system to monitor the monitoring area,
defining at least one protection area within the monitoring area,
analyzing camera images provided by the camera system of the protection area to detect whether a foreign object is present in the protection area or penetrates into the protection area,
classifying the foreign object based on the camera images if such a foreign object is determined to be present in the protection area or about to penetrate into the protection area, so as to determine on the basis of one or more features characteristic of welding sparks whether the foreign object is a welding spark,
triggering a safety-related function if the foreign object has not been recognized as a welding spark.

The herein presented device, method, and computer program are particularly suitable for monitoring robot facilities in automotive engineering, above all in the field of shell construction and vehicle body construction. This field of automobile production is usually highly automated and is characterized in that greatly varying welding tasks are carried out by robots using corresponding welding tools. In so-called spot welding procedures, sparks fly again and again depending on the wear and tear of the welding tools. Welding sparks fly from the welding point in all directions, either as individual sparks or as a spark cloud. In camera-based safety systems of the above-mentioned type, such welding sparks, which are also referred to as transient interference, would result in undesired shutdown and therefore limited availability of the machine. However, it has been found now that such welding sparks may be detected relatively easily on the basis of the characteristic features thereof and therefore can be filtered out, without resulting in restrictions on the safety of the system.

In the camera-based safety systems known from the prior art, it is typically not differentiated which object has caused the infringement of the protection area. This is also very difficult and questionable under safety-technology aspects, since an incorrect classification cannot be excluded and has the result that the hazardous movement of the machine or facility is not stopped, although, for example, a human is located in the hazardous area. The present disclosure, however, selects the reverse path, namely that initially all recognized objects represent an infringement of the protection area. These objects are thus all recognized as foreign objects and identified on the basis of the properties thereof as to whether they are safety-related foreign objects or welding sparks. In the worst case, this can have the result that an incorrect shutdown is not suppressed. The requirement is only that the foreign objects have characteristic features, which unambiguously differentiate them from those objects which are to be recognized (for example, humans).

However, the inventors have recognized that such a differentiation is entirely possible in the case of welding sparks. Welding sparks have very characteristic features, which are unambiguously detectable by analysis of the camera images. In particular in comparison to humans or other hazardous machine parts or interfering objects, welding sparks have a characteristic shape and brightness or a characteristic brightness curve. Welding sparks are usually visible in the camera images as a brightness trail, which is related to the high speeds thereof and the inertia of the camera sensors. Therefore, inferences about the speed of the welding sparks and the flight direction thereof may be drawn from the shape of such a welding spark trail. Due to the strong heating of the material, welding sparks have drastic brightening in the visible wavelength range, which may be differentiated clearly from the background in the camera image. In particular using camera technology which can image its surroundings highly dynamically, a quantitative estimation of the brightness is particularly possible. It may therefore be established on the basis of statistical analyses of the camera images in the analysis unit of the device with sufficient reliability whether a detected foreign object is a welding spark or not. The analysis unit is configured to trigger the safety-related function in any case if the foreign object has not been recognized as a welding spark or has not been recognized with sufficient reliability. The safety-related function is understood in the present case as a procedure which either results in shutdown of the machine, or brings it into a safe state. The camera images can be both two-dimensional and also three-dimensional image data.

The herein presented device and method thus increase the tolerance in relation to interfering influences during welding, without impairing the safety of the system. Welding sparks can be unambiguously recognized and suppressed by analysis of the camera images. This increases the machine availability by reducing undesired incorrect shutdowns, in particular in the case of robots to be safeguarded having corresponding welding tools.

In a refinement, the device furthermore has an image correction unit which is configured to replace or correct spatial regions in the camera images if a welding spark has been detected in these regions by the analysis unit.

This refinement is based on the idea of filtering out foreign objects, which have been recognized as welding sparks by the analysis unit on the basis of the characteristic features thereof, and replacing them with image data, which have been recognized by the analysis unit in downstream processing steps as no longer parts of foreign objects and can result in triggering of the safety-related function. The detected welding sparks are thus more or less erased from the camera images. This can be performed pixel-by-pixel or for entire pixel areas around the detected welding sparks. The image correction unit is preferably configured to perform this image correction or image replacement procedure already on the basis of the raw image data of the supplied camera images. For downstream processing steps, which evaluate whether foreign objects are located in the virtual protection area or not, the welding sparks are thus no longer even visible or present in the camera image. This has the advantage that valuable computing time no longer has to be wasted. In the downstream processing steps, the typical detection algorithms for recognizing foreign objects may thus be used, which are used in such camera-based safety systems and do not use such a classification (welding spark or not).

However, it is apparent that the inverse approach can also be implemented using the present device, namely that the analysis unit is configured to firstly classify the infringement of the protection area in a downstream processing step and only then to detect whether the infringement of the protection area is caused by a welding spark or not.

In a further refinement, the image correction unit is configured to replace the spatial regions to be replaced with image data of temporally preceding camera images.

This is a relatively simple option which requires little computing effort. As soon as a welding spark is detected in one of the camera images by the analysis unit, the corresponding image pixels are replaced by the image correction unit with image pixels of preceding camera images. This can again also be performed pixel-by-pixel or for an entire group of image pixels. Storing a reference image, which is otherwise used to replace the corresponding image pixels, is not necessary in this refinement. Moreover, this refinement has the advantage that upon a replacement of the corresponding image pixels with image pixels of temporally preceding camera images, the safety is additionally increased. Specifically, if a foreign object or the same foreign object occurs again in the replaced image pixels, the probability is thus high that the foreign object recognized as a welding spark is possibly not a welding spark, but rather is a safety-related part. In the most favorable case, the image region can be replaced pixel-by-pixel with the directly preceding image, since no spatial change of the camera position took place. In this manner, no further visible objects which are located in the monitoring area are eliminated. This procedure is preferably carried out in all available camera images, so that no measurements of the welding sparks, but also no artificial incorrect measurements are possible.

In a further refinement, the analysis unit is configured to analyze grayscale values of individual pixels of the camera images and to compare them to a grayscale threshold value, to determine on the basis thereof whether the foreign object is a welding spark.

The strong brightness occurring as a result of the heat of such welding sparks stands out in the camera images due to high grayscale values. Welding sparks generate a few pixels of large, bright spots having maximum grayscale values in the camera images. These grayscale values typically exceed the value which body parts of humans or other safety-related parts generate on the camera images. By comparing the grayscale values of individual pixels to a grayscale threshold value, which is typical for welding sparks, welding sparks may therefore be differentiated relatively exactly from other objects.

According to a further refinement, the analysis unit is configured to analyze a speed of the foreign object on the basis of at least one of the camera images and to compare it to a speed threshold value, to determine on the basis thereof whether the foreign object is a welding spark.

The high speeds of welding sparks are an unambiguous recognition feature. Persons or machine parts move at significantly lower speeds and only cover a few pixels per recording cycle within the camera image. If the detected foreign object thus exceeds a maximum speed, which is typical for welding sparks, it may thus be identified relatively unambiguously as a welding spark.

The determination of the speeds of foreign objects from the camera images can be performed in various ways. This is either performed in the analysis unit by comparing temporally successive camera images to one another. It is measured in this case which path the foreign object has covered from one camera image to the other. At the same time, the time interval between the recording of the two camera images is known, so that the speed of the foreign object may be calculated therefrom. However, this requires that the foreign object can be unambiguously tracked between the individual camera images. This has proven to be problematic in the case of welding sparks, however. A direct assignment of an identical welding spark in camera images which were recorded at different points in time is relatively complex. This has multiple reasons. On the one hand, the flight speeds can be so high and the time intervals of the recordings can be sufficiently far apart that the welding spark only occurs in one image. On the other hand, the sparks can be unstable and can decompose into multiple objects in the next recordings, so that an unambiguous assignment is no longer possible. On the other hand, such an appearance, specifically that a welding spark is only recognizable in one image, but not in the temporally successive image, may be used as a characteristic recognition feature.

In a further refinement, however, the analysis unit is configured to determine the speed of the foreign object on the basis of an illumination time of the camera system, a detected distance of the foreign object, and a number of pixels which the foreign object occupies in the camera image.

The determination of the speed of the foreign object may thus preferably be determined on the basis of only one camera image. In the case of welding sparks, in particular the shape of the trail generated in the camera image provides an inference about the speed thereof. In particular, the length of the welding spark trail plays a role in this case. The longer the trail which is imaged in the camera image, the more rapidly the welding spark moves. The illumination time of the camera system also has an influence on the length of the trail. A further influencing variable is the distance of the welding spark from the optics of the camera system. If these influencing variables are known, the speed of the welding spark may be estimated very well.

In a further refinement, the analysis unit is configured to determine, in at least one of the camera images, a spatial distribution of grayscale values in an image region of a detected foreign object, to determine on the basis thereof whether the foreign object is a welding spark.

The spatial distribution of grayscale values may include a 2D or 3D planar grayscale value curve, i.e. a comparison of the grayscale values of individual adjacent pixels to one another. The analysis unit can thus be designed to compare grayscale values of pixels, which are greater than the above-mentioned grayscale threshold value, to the grayscale values of adjacent pixels. Welding sparks typically have a characteristic brightness curve in a camera image, which is greatest in the center of the welding spark and decreases outward. This brightness curve comes to bear in recording systems, the camera of which displays a "delaying behavior". Pixels of CMOS cameras, as are preferably used for the present application, also consist, in addition to a number of transistors, of a capacitor, which stores charges and emits them during the read operation. This component results in time delay effects. Short-term light effects are not imaged immediately on the pixel, but rather have a delaying behavior. For this reason, a trail is observed during the recording in the case of a moving welding spark. Depending on the structure of the pixel, these trailing effects occur more or less. Therefore, the proposed methods can be transferred to camera systems having similar temporary properties.

Such a trail in the camera images is therefore characteristic of the welding spark. Welding sparks usually follow a straight curve in the recordings. The grayscale value gradients and a precise contour direction can be determined by way of the brightness difference thereof from the background. An almost exponential decrease in the brightness values may be observed along the trail. By analyzing the grayscale values of adjacent pixels, it may thus be established relatively accurately whether it is such a characteristic grayscale value gradient and therefore whether the foreign object is a welding spark or not.

The analysis unit is preferably also configured to estimate a size and/or a shape of the foreign object from the spatial distribution of the grayscale values.

On the basis of the grayscale values, the outline contour of the foreign object may be delimited relatively well. If the analysis unit determines that it is a rod-shaped shape, which has the typical size of a welding spark, the foreign object is thus identified as a welding spark and the safety-related function is not triggered.

In a further refinement, the analysis unit is furthermore configured to estimate a movement direction and/or an origin location of the foreign object from the spatial distribution of the grayscale values.

This is possible relatively well for the above-mentioned reasons in the case of welding sparks on the basis of the trail thereof occurring in the camera image. The trail occurring in the camera image of a welding spark is typically, viewed in the flight direction, brightest in the image region of its front end and decreases continuously proceeding therefrom, opposite to its flight direction. The exponential grayscale value gradient curve of adjacent image pixels, which image the trail of a welding spark, therefore provides relatively good inferences about its flight direction. The origin of the welding spark, and thus its origin location, may also be estimated from the flight direction. The analysis unit can thus also, for example, be configured to detect foreign objects, to which a specific predefined origin location is assigned on the basis of the grayscale value gradient curve, as welding sparks. If it may be estimated from the grayscale value gradient curve, for example, that the foreign object has its origin directly from the welding tool, it can be concluded with greater reliability that it is a welding spark.

It is apparent that the analysis unit preferably performs the classification into welding sparks or other foreign objects on the basis of multiple or all above-mentioned characteristic features. The more these characteristic features are incorporated into the analysis of the analysis unit, the more reliably may it be concluded therefrom whether a detected foreign object is a welding spark or not.

In a further refinement, the analysis unit is configured to determine a contour of the foreign object by means of a skeletonization that is based on the spatial distribution of the grayscale values, wherein for generating said skeletonization a chain of adjacent pixels having grayscale values greater than a grayscale threshold value is determined in at least one camera image.

Such a skeletonization is particularly suitable for reconstructing the trail generated by a welding spark in the camera image or the contour thereof. In this case, a chain or concatenation of the pixels which have the highest grayscale values is constructed. This chain is also referred to as a skeleton. Such skeletonizing for reconstruction of the welding spark trail is used in particular to acquire the shape of the trail in the camera image, to then replace the pixels covered by the welding spark trail, as mentioned above, with pixels of preceding images from reference images, which show the background. During the skeletonizing, the welding spark trail is scanned step-by-step within the image processing. A starting pixel is preferably firstly determined for this purpose. For example, the pixel having the highest grayscale value, which is greater than the above-mentioned grayscale threshold value, can be used as the starting pixel. Proceeding from this starting pixel, all eight adjacent pixels are then checked for the grayscale values thereof and the pixel is in turn selected which has the highest grayscale value among them. The skeleton is thus combined pixel-by-pixel iteratively, until either a predefined maximum length is reached (first termination criterion) or the trail no longer differs from the image background with respect to the brightness/the grayscale value. A chain of individual pixels (skeleton) along the trail thus results proceeding from the bright center of the welding spark trail. The analysis unit can then calculate a length of the foreign object from the skeleton and can determine on the basis of this length whether the foreign object is a welding spark or not. The result of the skeletonizing can then also be used to determine the movement direction of the foreign object or the welding spark.

In a further refinement, the analysis unit is configured to combine the grayscale values of the pixels into groups for skeletonizing.

This is used in particular for avoiding aberrations during the skeletonizing. So as not to lose the general curve of the skeleton due to local discontinuities in the grayscale image, the contour has to be found using robust methods. Therefore, it is advantageous for the step-by-step construction of the skeleton not to compare grayscale values of individual pixels, but rather to combine the grayscale values into pixel groups. In this way, in particular the influence of noise can be reduced. The analysis unit preferably combines the grayscale values of three pixels into a pixel group in each case for this purpose. The analysis unit then uses the group of three pixels which has the highest grayscale value total or the highest grayscale mean value, to expand the skeleton by one pixel. This will be illustrated further on the basis of the following figures.

In a further refinement, the analysis unit is configured to compare temporally successive images to one another.

The analysis unit is preferably configured in this case to compare image regions of the acquired camera images, in which a foreign object was detected, to the corresponding image region in at least one temporally preceding camera image, to determine whether the foreign object was also localized in the corresponding image region of the preceding camera image.

As already mentioned above, one of the characteristic properties of welding sparks is the high speed thereof. It may be derived therefrom that it is also decisive for the welding spark detection whether a spark was already detected in the same image area in the preceding recording. If this is not the case, the spark has then exceeded the maximum speed and it is not a person or machine. However, if an object similar to a welding spark was already located in the previous image, it is then not possible to exclude that it could be another relevant object. The comparison of temporally successive images therefore helps to additionally increase the classification reliability as to whether it is a welding spark or not.

In a further refinement, the camera system is a multichannel-redundant, multi-ocular camera system, which is configured to determine a distance value that is representative of a spatial location of the foreign object, wherein the distance value is determined by a runtime measurement method and/or by a stereoscopic comparison of two simultaneous camera images.

Such a camera system is described in EP 1 543 270 B1, the content of the disclosure of which is hereby incorporated in its entirety by reference. Such a camera system is sold by the applicant under the name SafetyEYE.

In a runtime measurement method, the runtime of a signal, in particular a light signal, to a foreign object and back is measured. The distance to the foreign object may be determined from the known propagation speed of the signal. Runtime measurement methods are a very cost-effective option for obtaining items of distance information and enabling three-dimensional image analysis.

Stereoscopic methods for determining items of distance information are similar to the functioning of the human eye, in that they determine the distance to an object on the basis of the so-called disparity, which results in the at least two camera images as a result of the slightly different viewing angles. It is obvious that this refinement also includes trinocular methods and devices, i.e., this refinement is not restricted to the use of precisely two cameras or two camera images. Three-dimensional monitoring of a monitoring area with the aid of a stereoscopic method is particularly suitable for the preferred application, because redundant systems are advantageous with respect to the single error reliability. A stereoscopic system can optimally use the multiple provided cameras or image recording units.

It is apparent that the above-mentioned refinements relate not only to the device defined in the patent claims, but rather also relate to the method placed under protection. The novel method accordingly has identical or similar refinements to the novel device.

It is also apparent that the above-mentioned features and the features still to be explained hereafter are usable not only in the respective specified combination, but rather also in other combinations or alone, without leaving the spirit and scope of the present disclosure.

DESCRIPTION OF PREFERRED EMBODIMENTS

Figure 1:
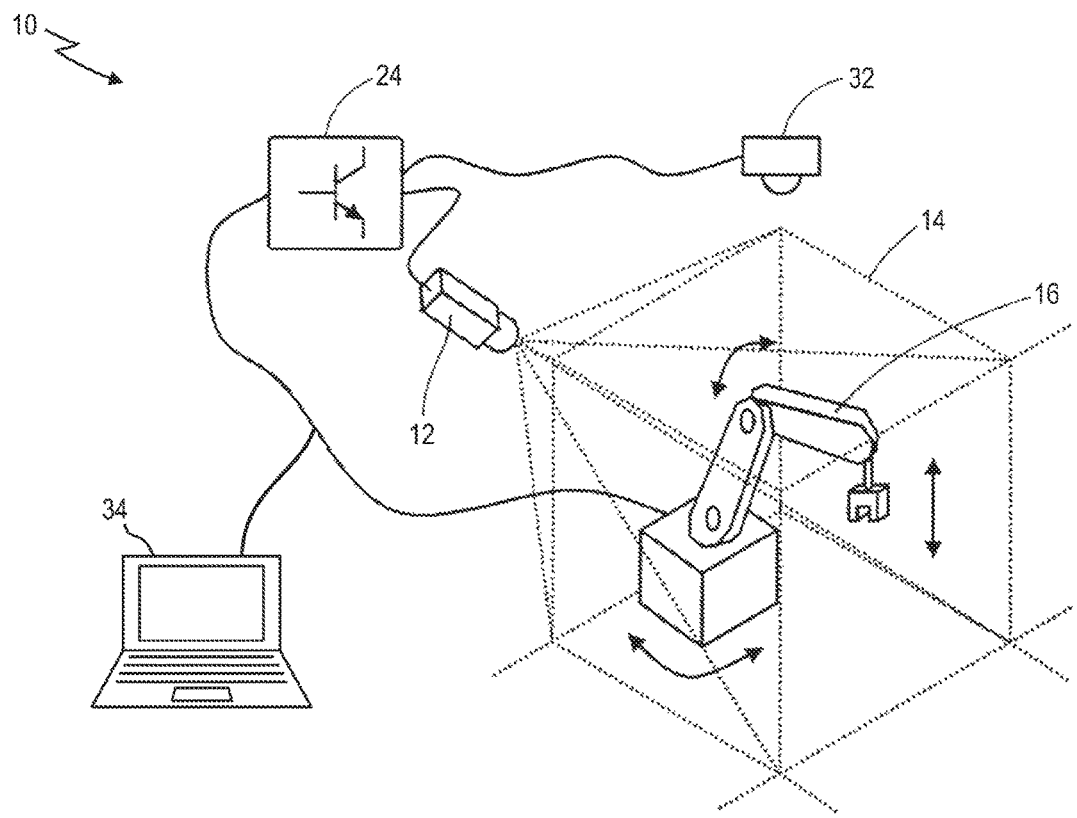
FIG. 1 shows a simplified illustration of an exemplary device according to the disclosure.
Figure 2:
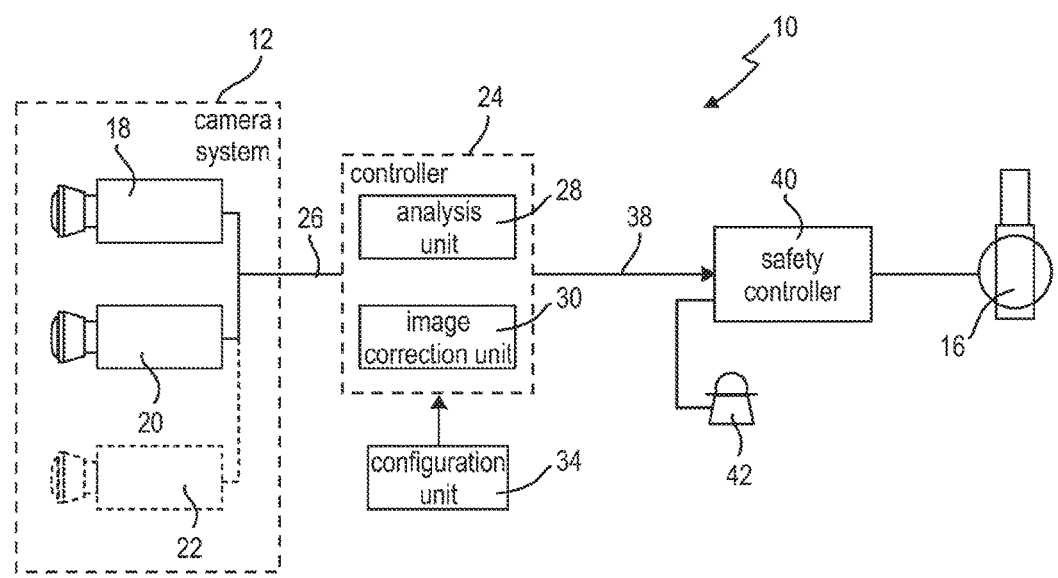
FIG. 2 shows a simplified illustration of the device according to the disclosure in a block diagram.

A preferred exemplary embodiment of the novel device is identified in its entirety with the reference sign 10 in FIGS. 1 and 2.

The device 10 contains at least one camera system 12, which is designed to monitor a spatial area or monitoring area 14, in which an automatically operating facility or machine, a robot 16 here, is arranged. The camera system 12 is oriented on the monitoring area 14 for this purpose.

The camera system 12 is preferably embodied as a multichannel-redundant, multi-ocular camera system having at least two image recording units 18, 20, preferably also having a third image recording unit 22. The image recording units 18, 20, 22 can be complete, independently functional cameras. In this case, these are preferably cameras which are equipped with CMOS or CCD sensors. In particular, the image recording units 18, 20, 22 can be catadioptric cameras, i.e., cameras which use curved mirrors as imaging elements, to have a ring-shaped field of vision around a blind spot located in extension of the optical axis thereof.

The cameras 18, 20, 22 supply two or three images, which are slightly offset from one another, of the monitoring area 14 to be safeguarded. As a result of the offset of the cameras 18, 20, 22 in relation to one another and with the aid of trigonometric relationships, the distance from the camera system 12 to objects in the monitoring area 14 can be determined on the basis of the camera images. A preferred camera system of this type is described in EP 1 543 270 B1, which was mentioned at the outset. In other exemplary embodiments, the camera system 12 can contain a runtime camera. This is to be understood as a camera which, on the one hand, supplies 2D images of an area to be monitored. In addition, the camera supplies items of distance information which are obtained from a runtime measurement. The camera system 12 can also be designed to function as a 3D scanner and/or to use another technology which enables 3D images to be generated of the monitoring area 14 to be secured.

In addition, in other exemplary embodiments, multiple 1D and/or 2D sensors can form a 3D sensor unit in pairs and/or as an entirety, which supplies the required 3D images of the monitoring area 14. It is thus not absolutely necessary, although it is preferred, to use a stereo camera system 12 for the device 10.

The camera system 12 is connected to a controller 24. This is preferably performed via a bus 26. Instead of a spatially remote controller 24, it is alternatively also possible to integrate the image recording units or cameras 18, 20, 22 and the controller 24 in a shared housing for this purpose, or to use another analog or digital interface. The arrangement shown in the present case having a spatially separated controller 24 has the advantages of a modular system, such as low weight of the individual components, separate replacement ability, etc.

The controller 24 preferably has an analysis unit 28. This analysis unit 28 is configured to analyze the camera images recorded by the camera system 12 and, in the case of a hazardous situation, to trigger a safety-related function, preferably a shutdown signal, which results in a shutdown of the robot 16. The controller 24 preferably also has an image correction unit 30, the function of which will be explained hereafter. The analysis unit 28 and the image correction unit 30 can either be implemented as separate units, based on software and also on hardware. Alternatively thereto, these two units 28, 30 can also be implemented in one shared unit, which is based on software or hardware, inside the controller 24. The connections shown in FIGS. 1 and 2 between camera system 12, controller 24, and machine 16 can each be embodied as wired or wireless connections. In one preferred exemplary embodiment, the controller 24 is a conventional computer, on which software is installed, which implements the analysis unit 28 and the image correction unit 30.

The reference sign 32 in FIG. 1 identifies a light source, which can optionally be provided to illuminate the monitoring area 14. In some exemplary embodiments, the light source 32 can be used to generate light signals, from the runtime of which the distance to objects in the monitoring area 14 can be determined. In the preferred exemplary embodiments, however, the light source 32 is only used for illuminating the monitoring area. A 3D acquisition of the monitoring area 14 is preferably performed, as already mentioned above, with the aid of a stereoscopic image recording.

Figure 3:
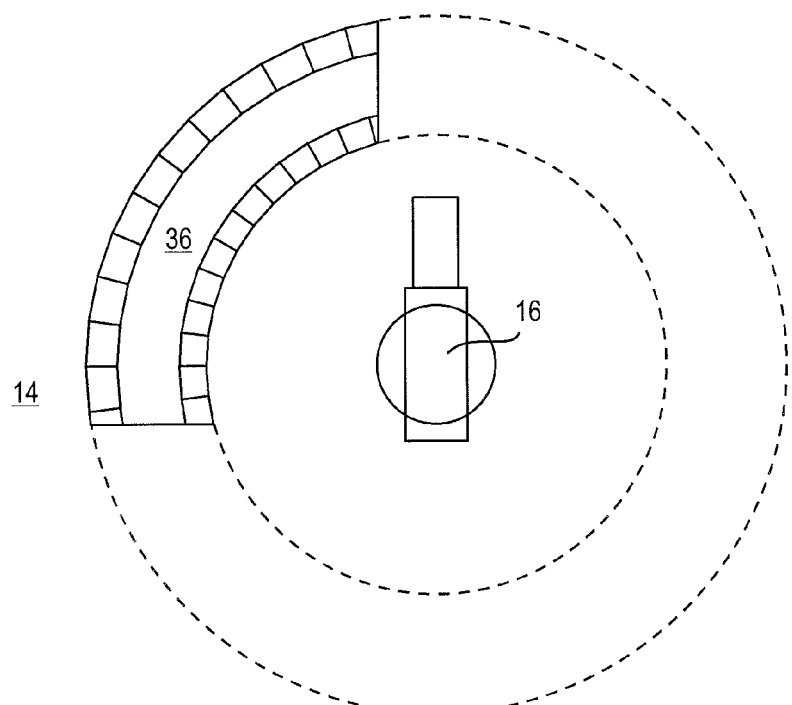
FIG. 3 shows an outline to explain a preferred application of the device according to the disclosure.

Furthermore, FIGS. 1 and 2 also schematically show an input module 34, which is also referred to in the present case as a configuration unit 34. The configuration unit 34 can be used for installation and configuration of the device 10, in particular the camera system 12. It is used, as explained in detail hereafter, in particular for setting and configuration of at least one virtual protection area 36 (see FIG. 3). The configuration unit or the input module 34 can be adapted as a special input panel on the device 10. Alternatively thereto, however, it can also be implemented by a conventional computer, on which software is installed, which is suitable for the installation and configuration of the device 10. The controller 24 including analysis unit 28 and image correction unit 30 and also the configuration unit 34 can either be implemented as two separate conventional computers. Alternatively thereto, the controller 24 and the configuration unit 34 can also be implemented in combined form by one computer.

Furthermore, it is also to be noted that the device 10 can also contain multiple controllers 24 or analysis units 28, which are connected to one another via a bus or another communication medium. In addition, it is possible that a part of the signal and data processing power of the camera system 12 is housed in the controller 24 or the analysis unit 28. For example, the determination of the position of an object on the basis of the stereo images of the cameras 18, 20, 22 can be performed in a computer, which also implements the analysis unit 28. The individual cameras or image recording units 18, 20, 22 of the camera system 12 also do not necessarily have to be housed in a single housing.

Rather, the camera system 12 can also be distributed to multiple assemblies and/or housings, although it is preferable to implement the camera system 12 as compactly as possible.

As already mentioned, the analysis of the individual camera images is performed in the analysis unit 28. This analysis unit 28 analyzes in particular whether a foreign object is present in the virtual protection area 36 or penetrates into the protection area 36. If such a foreign object is recognized by the analysis unit 28, it thus generates a so-called OSSD signal 38 (Optical Safety Switching Device signal). This signal is preferably relayed to a safety controller 40, which thereupon shuts down the machine 16 or brings it into a safe state. In addition, an emergency off button 42 can be connected to this safety controller 40, which enables an operator to shut down the machine 16 manually by actuating this emergency off button 42. The emergency off button 42 can also be a protective door, upon the opening of which the machine 16 is shut down.

The safety controller 40 preferably contains relays or safeguards. Using the safety controller 40, the drives of the monitored machine 16 can be shut down in a way known per se. The safety controller 40 can also be implemented in the form of a failsafe PLC (programmable logic controller) for example. In this case, it is preferable if the analysis unit 28 or the controller 24 is connected via a secure field bus, for example, the so-called Safety Bus® from Pilz GmbH & Co., Germany, to the safety controller 40. The safety controller 40 is, for example, a PSS 3000 from Pilz GmbH & Co., Germany.

To generate this OSSD signal, the analysis unit 28 analyzes the camera images supplied by the cameras 18, 20, 22 by means of greatly varying image processing methods. Firstly, so-called image preprocessing is performed in the analysis unit 28 for this purpose. Depending on the application, methods known per se are carried out here to condition the recorded camera images, for example, an FPN correction (Fixed Pattern Noise). Furthermore, the recorded camera images are adapted to one another with regard to base brightness levels, etc. Subsequently, the actual analysis of the camera images is performed, for example, with the aid of two different scene analysis methods, to detect foreign objects within the monitoring area 14. Within this scene analysis method, the analysis unit 28 can execute a contour-based image analysis, which includes a region segmentation, i.e., a division of the camera images into individual regions to be compared. Preferably, only image regions which differ significantly from a reference image are then analyzed. On the basis of the results of the scene analyses, the analysis unit 28 analyzes whether a protection area infringement exists, i.e., whether an object has impermissibly penetrated into the monitoring area 14. This analysis or check does not necessarily have to be carried out for the entire monitoring area 14. It is preferably only carried out for partial areas of the monitoring area 14. For this purpose, with the aid of the configuration unit or the input module 34, at least a virtual, three-dimensional protection area 36 is defined within the monitoring area 14 (see FIG. 3). This protection area 36 is preferably defined all around the machine 16. The shape and size of the protection area 36 and the distance of the protection area 36 from the machine 16 may be set individually depending on the requirement. This is preferably performed manually or automatically in a software-supported manner. Of course, multiple protection areas 36 may also be configured around the machine 16. For example, a further outer warning area (not shown) may additionally be configured. In such a case, the analysis unit 28 is configured to only output a warning signal upon detection of a foreign object in the warning area, whereby, for example, a warning tone or a visual warning signal is generated. Upon detection of a foreign object inside the protection area 36, however, the analysis unit 28 generates a shutdown signal, which results in the above defined manner in a shutdown of the machine 16 or brings the machine 16 into a safe state.

Figure 5:
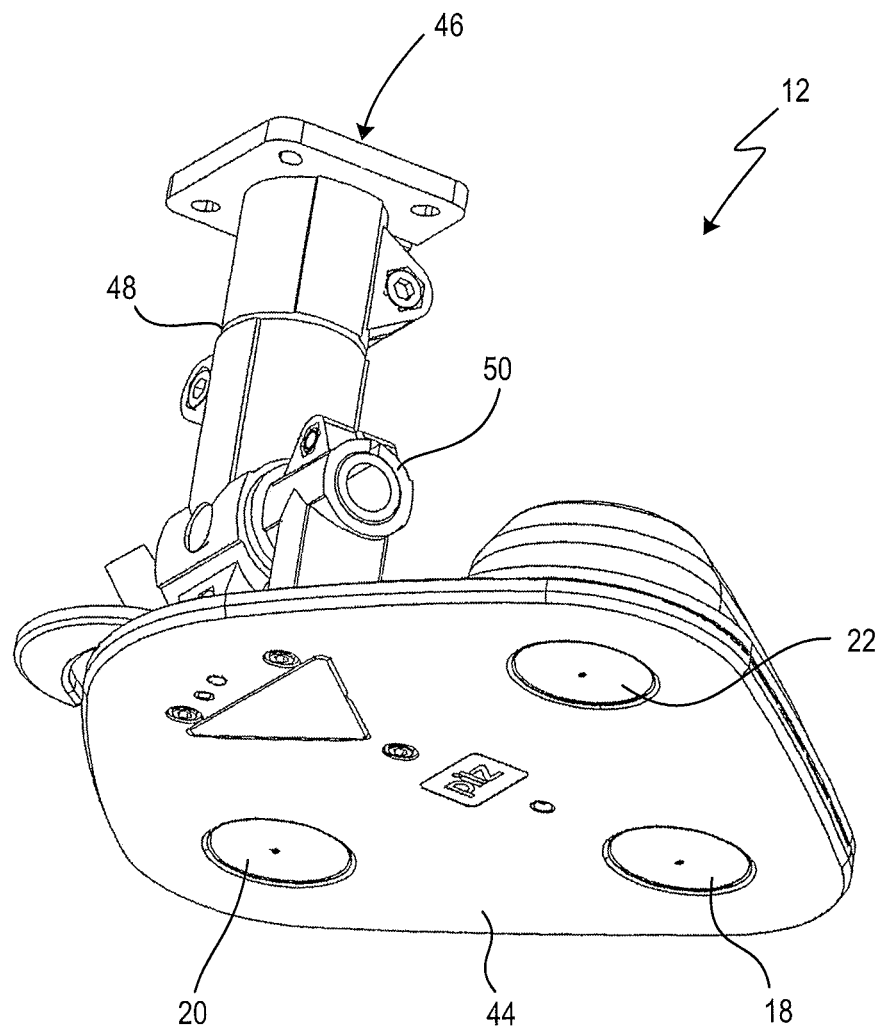
FIG. 5 shows a perspective illustration of a camera system, which can be used in the device according to the disclosure, diagonally from below.

FIG. 5 shows a preferred embodiment of a sensor unit of the camera system 12, as is sold by the applicant under the name SafetyEYE. As already explained, the entire system also typically includes, in addition to the camera system 12, the analysis unit 28 and the safety controller 40, as shown in FIGS. 1 and 2. According to this embodiment, the camera system 12 has a system body 44, which is embodied in the form of a substantially planar plate. This plate 44 has an approximately rhomboid footprint here. The three image recording units 18, 20, 22 are arranged in three of the four "corners" of the system body 44. A mounting part is identified with the reference sign 46, with the aid of which the camera system can be fastened on a wall, a mast, or the like (not shown here). The mounting part 46 is a mounting arm here having multiple pivot joints 48, 50, which enable pivoting of the system body 44 about at least two axes of rotation, which are orthogonal to one another. The system body 44 may preferably also be pivoted about a third axis of rotation orthogonal thereto. The associated pivot joint is concealed in the view of FIG. 5, however. The image recording units 18, 20, 22 may therefore be oriented relatively easily onto the monitoring area 14 to be monitored. The three image recording units 18, 20, 22 span a triangle on the system body 44. The camera images generated thereby are therefore slightly offset from one another. The image recording units 18, 20 or 18, 22 form a pair in each case, wherein the distance of the image recording units 18, 20 from one another and the distance of the image recording units 18, 22 from one another are exactly equal and invariable in this exemplary embodiment. These two distances each form a base width for a stereoscopic analysis of the image recording units 18, 20 and 18, 22. In principle, the image recording units 20, 22 could additionally also be used as a pair for a separate stereoscopic analysis. Because the two stereoscopic image recording unit pairs 18, 20 and 18, 22 are not arranged along a shared straight line, objects may also be detected in the monitoring area 14 which are not visible to a single camera pair, for example, as a result of shadows due to other objects. In addition, it is ensured with the aid of the three image recording units 18, 20, 22 that the distance to arbitrary objects in the monitoring area can be determined. If only two image recording units were used, the distance to an elongated contour extending in parallel to the base width could possibly not be determined.

The device according to the disclosure is specialized in particular for monitoring welding tools or welding robots. With such welding robots, depending on the wear and tear of the welding tools, a plurality of welding sparks arise, which propagate from the welding point outward in all directions. In previously known camera systems of the above-mentioned type, these welding sparks would be recognized as foreign objects, so that an undesired shutdown of the machine 16 then occurs. This results in undesired stoppages of the production facility and therefore in production breakdowns, which are to be avoided. The device 10 avoids such undesired stoppages by way of skilled recognition of the welding sparks within the camera images and corresponding filtering of these welding sparks out of the camera images. This procedure is executed by the analysis unit 28. The analysis unit 28 is configured to classify a foreign object 53, which is present in the at least one protection area 36 or penetrates into the protection area 36, by way of analysis of the camera images, to determine on the basis of one or more features characteristic for welding sparks whether it is a welding spark or another type of foreign object in this case. In dependence on this classification, the analysis unit 28 only triggers the safety-related function (for example, a shutdown signal) if the detected foreign object is not recognized as a welding spark.

It has been shown that welding sparks have characteristic features which may be detected using methods of object recognition by the analysis unit 28.

The characteristic features of the welding sparks include: the speed thereof, the size thereof in the camera image, the design and shape thereof in the camera image, the brightness or grayscale values thereof, which they generate in the camera image, and the spatial brightness or grayscale value curve thereof occurring in the camera image. The analysis unit 28 is therefore preferably configured to perform the above-mentioned classification on the basis of one of these features or a combination of these features characteristic for welding sparks.

The speed can be measured by the analysis unit 28 in various ways. On the one hand, this can be performed by a comparison of two temporally successive camera images. In this case, it is measured by the analysis unit, for example, by single pixel comparison, which path the foreign object has covered from one camera image to the temporally successive camera image. The precise distance measurement can be performed on the basis of the above-mentioned stereoscopic analysis method. With the aid of the known time interval between the two compared camera images, the speed of the foreign object may then be calculated. Experiments of the applicant have shown, however, that tracking individual welding sparks over a sequence of multiple camera images is relatively difficult because of the high speeds thereof. In one preferred embodiment, the speed of such a welding spark is therefore determined as follows by the analysis unit 28. Because of the inertia of the CMOS sensors preferably used in the camera system 12, the welding sparks 52 appear as a trail in the individual camera images.

Figure 6:
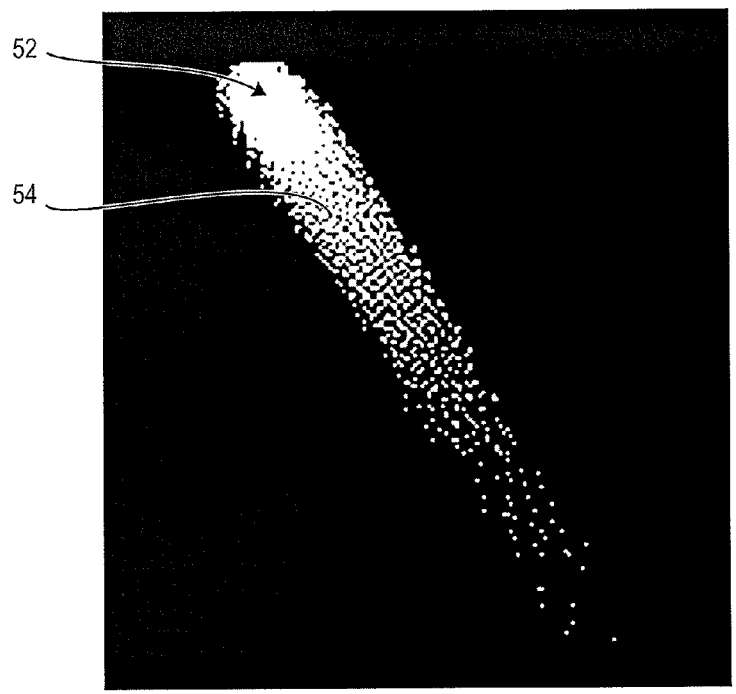
FIG. 6 shows an exemplary illustration of a trail generated by a welding spark in a camera image.

Such a welding spark 52 is shown as an example in FIG. 6 with the trail 54 resulting in the camera image. The appearance of such a trail 54 permits inferences, which can be used in the analysis unit 28 to determine the speed of the welding spark 52. The shape and length of the welding spark is specifically dependent, on the one hand, on its speed and, on the other hand, on the illumination time of the camera sensor. The higher its flight speed and the longer the illumination time of the sensor, the longer the trail 54 is also. The distance between welding sparks and the camera system 12 is a further factor to be considered for determining the speed of the welding spark 52. The analysis unit 28 is thus preferably configured to determine the speed of the welding spark 52 on the basis of the illumination time of the camera system 12, the detected distance of the welding spark, and the length of the welding spark trail 54.

Independently of which of the two above-mentioned methods is used to determine the speed of a foreign object from the camera images, it may thus be unambiguously determined whether the foreign object is a welding spark 52 or not. This is preferably performed in the analysis unit 28 by comparing the determined speed to a speed threshold value. The speed threshold value is preferably defined in this case so that it can only be exceeded by welding sparks 52, but not by safety-relevant objects or subjects such as machine parts or human body parts.

Alternatively to the above-mentioned speed ascertainment, the classification into welding sparks and other safety-relevant foreign objects may also be determined in a third way. The analysis unit 28 can also be configured, upon detection of a foreign object, to compare the image region in which the foreign object was detected to the corresponding image region in a temporally preceding camera image. If no such foreign object was recognized in the corresponding image region in the temporally preceding camera image, the speed of the foreign object exceeds the defined speed threshold value with high probability, from which it can be concluded that the foreign object is a welding spark 52.

Figures 4A, 4B:
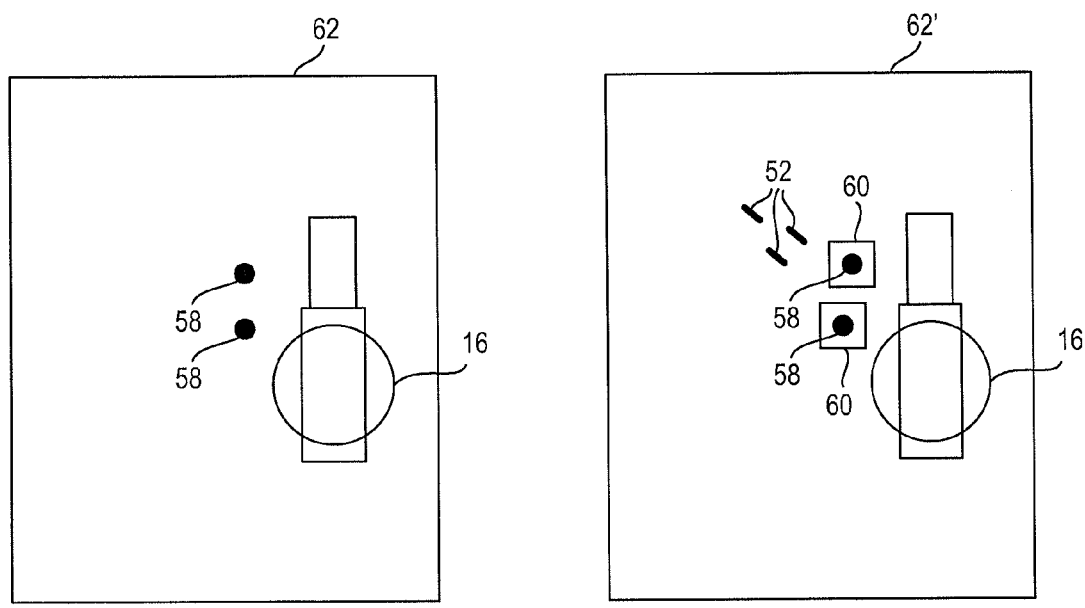
FIGS. 4a and 4b show schematic illustrations of two camera images which are generated and analyzed by the device according to the disclosure.

Two such temporally successive camera images 62, 62' are schematically shown in FIG. 4. The camera image 62' which is schematically shown in FIG. 4b temporally follows in this case the camera image 62 which is schematically shown in FIG. 4a. In the schematically shown situation, the analysis unit 28 has detected two foreign objects 53 in the first camera image 62. It has been shown on the basis of the comparison of the corresponding image region in the temporally successive camera image 62' (see FIG. 4b) that the foreign objects 53 are also detectable in this image at the detected point. According to the above-mentioned logic, they are then classified as safety-relevant foreign objects 58, which is indicated in FIG. 4b by a rectangle 60 which encloses the foreign objects 58. The foreign objects 53 in the camera image 62', which appear further to the left at the top in the image region, were not detected in the preceding camera image 62, however. According to the above-mentioned logic, this indicates that these objects 53 are welding sparks 52, which exceed the speed threshold value.

As a result of the typically very high brightness or grayscale values, which such a welding spark 52 generates in the camera image, the size thereof may also be determined in a simple manner, since it may be delimited very unambiguously from the background in the camera image. The analysis unit 28 can thus also be configured to determine the size of the foreign object 53 and to compare the size thus determined to a size threshold value. If the determined size falls below this size threshold value, it can thus also be concluded therefrom that the detected foreign object 53 has to be a welding spark 52. A further characteristic is the shape of such a welding spark 52. As is apparent in FIG. 6, it typically has a rod-shaped formation in a camera image. Together with the identified size, this is also an indicator that the detected foreign object 53 is a welding spark 52 or a safety-relevant object 58.

Because of the high heat of welding sparks 52, they have very high grayscale values in the camera image. For identification of the welding sparks 52, the grayscale values of an identified foreign object may be compared, i.e., either pixel-by-pixel or in groups of pixels (for example, total of the grayscale values of a pixel group or arithmetic mean of the grayscale values of a pixel group) to a grayscale threshold value, which is typically not exceeded by other foreign objects.

A further feature which has proven to be a good indicator for the recognition of a welding spark 52 is the characteristic spatial grayscale value curve thereof, which it generates in a camera image. As is apparent in FIG. 6, a welding spark 52 generates a clear grayscale value drop, which, proceeding from the center of the welding spark 52, is opposite to its flight direction. The further back, viewed temporally, the traverse of a specific image region is, the more the grayscale value of the resulting welding spark trail 54 approaches the original background.

Figure 7:
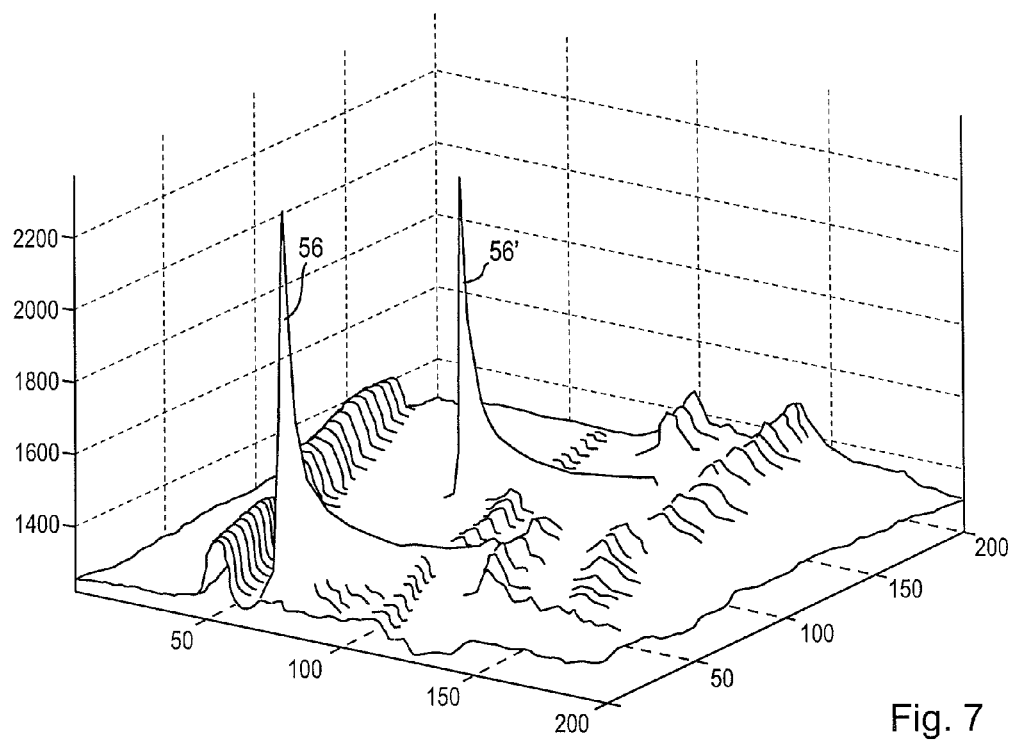
FIG. 7 shows a grayscale value analysis of a camera image of two welding sparks.

FIG. 7 shows a quantitative analysis of the spatial grayscale value distribution of an image region, in which two welding sparks occur. The grayscale value curves of the two welding sparks are identified therein with the reference sign 56 and 56', respectively. The grayscale value curves 56, 56' appear therein as a type of mountain ridge, which have an approximately exponential grayscale value drop along the "mountain ridge". The analysis unit 28 can thus also be configured to study the spatial grayscale value curve within an image region in which a foreign object 53 was detected, and to suppress the safety-related function i.e., not to trigger it, if such an exponential grayscale value drop typical for welding sparks 52 is detected. In other words, the analysis unit 28 is thus configured to analyze image pixels adjacent to the grayscale value gradient, to compare them to a grayscale value gradient range typical for welding sparks 52. The flight direction of the welding spark 52 may also be determined relatively exactly on the basis of the grayscale value gradient. This flight direction may also be used in the above-mentioned classification of the foreign objects 53. Specifically, the origin of the foreign object 53 may be estimated from the flight direction. The analysis unit 28 can be taught during a teach-in procedure, for example, that welding sparks 52 typically originate from defined local origins, specifically the location of the welding tool.

Figure 8:
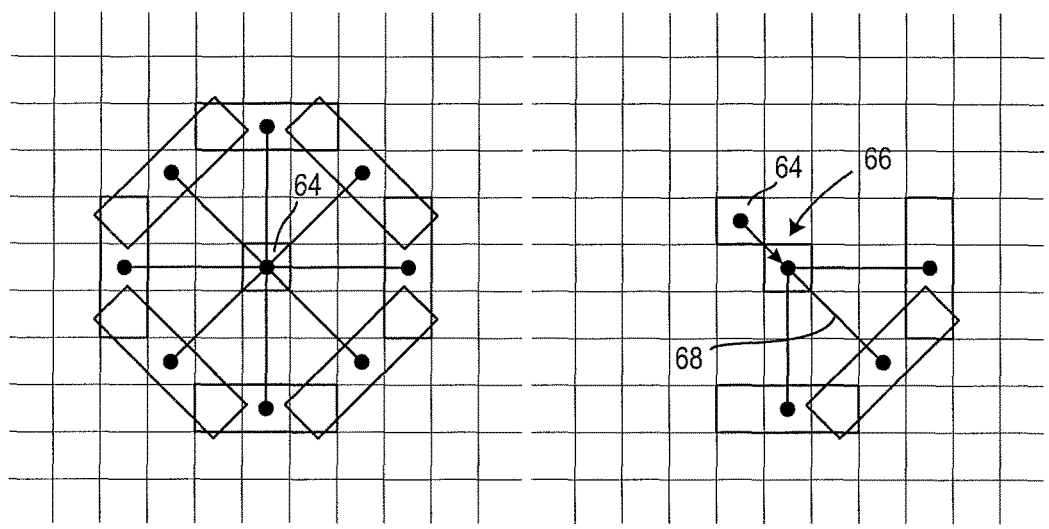
FIG. 8 shows a schematic illustration of a skeletonizing method implementable with the device according to the disclosure.

The contour and alignment or flight direction of a welding spark is preferably determined inside the analysis unit 28 on the basis of a skeletonizing method. The principle of such a skeletonizing method is schematically shown in FIG. 8. The trail 54 of a welding spark is scanned step-by-step in this case to generate a so-called skeleton. Proceeding from a starting pixel 64, which preferably has the highest grayscale value, the grayscale values of adjacent pixels are checked in eight search directions. For this purpose, the grayscale values of multiple pixels, preferably three pixels, are combined either as a total or as mean values and are compared to the remaining seven groups of three pixels. This combination substantially improves the robustness of the method, since local discontinuities in the grayscale image do not result in errors in the skeletonizing. In this manner, a chain 66 of adjacent image pixels having maximum grayscale values thus results. As soon as the general basic direction 68 of the trail 54 is known, the search region can be limited to three directions, as schematically shown in the right part of FIG. 8. The respective basic direction 68, the group of three of which has the highest grayscale value total or the highest grayscale mean value, is used to expand the chain 66 by one further pixel. The skeleton may thus be combined pixel-by-pixel iteratively, until either a maximum length is reached, or the trail 54 no longer differs from the background with respect to the brightness.

The above-mentioned skeletonizing can be used not only to reconstruct the shape and design of the welding spark 52, it can also be used in a further method step inside the image correction unit 34 to replace the regions or pixels which are covered by the welding spark 52 in the camera image with image data or pixels of a reference image or with pixels of a preceding camera image. If no spatial change of the camera position takes place, the pixel-by-pixel replacement of the pixels covered by the welding spark 52 with pixels of the previous image is a preferred procedure. This replacement or image correction is preferably performed by the image correction unit 34. This image correction unit 34 is implemented, for example, as software in a computer connected to the camera system 12. It is apparent that the above-mentioned skeletonizing can also be executed by this image correction unit 34. The image correction unit 34 preferably replaces not only the image pixels from the previously determined skeleton, but rather also the image pixels spatially adjoining the skeleton, i.e., all lightened adjoining regions. This may be delimited precisely by pixel by so-called "region growing" methods, for example. This replacement procedure is preferably carried out by the image correction unit 34 in all available camera images, so that finally a welding spark 52 no longer appears in any of the camera images.

The image correction unit 34 particularly preferably already uses the raw image data of the camera images. In other words, the welding sparks are thus already filtered out in relatively early processing steps. In downstream processing steps of the image processing, which are executed by the analysis unit 28, within which it is analyzed whether foreign objects 53 are located in the protection area 36 or not, the welding sparks 52 are thus no longer even present. This has the advantage that the downstream analysis process no longer has to contain the above-mentioned welding spark consideration and therefore computing time can be saved. However, it is to be mentioned here that such an image correction is not absolutely necessary. It is also possible to leave the welding sparks 52 in the camera images (i.e., not to replace them with pixels of other camera images), wherein the analysis unit 28 then only analyzes in the downstream processing steps whether a detected foreign object 53 is a welding spark 52 or not.

Figure 9:
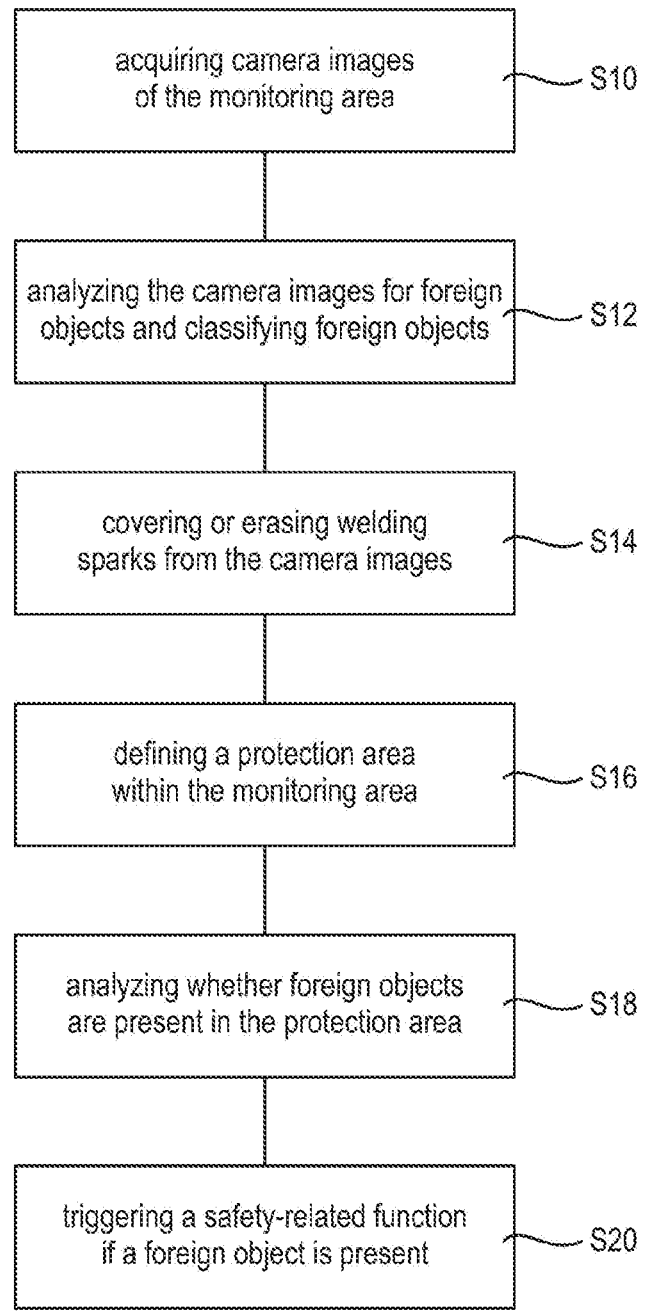
FIG. 9 shows a simplified flow chart to explain the method according to a first embodiment.
Figure 10:
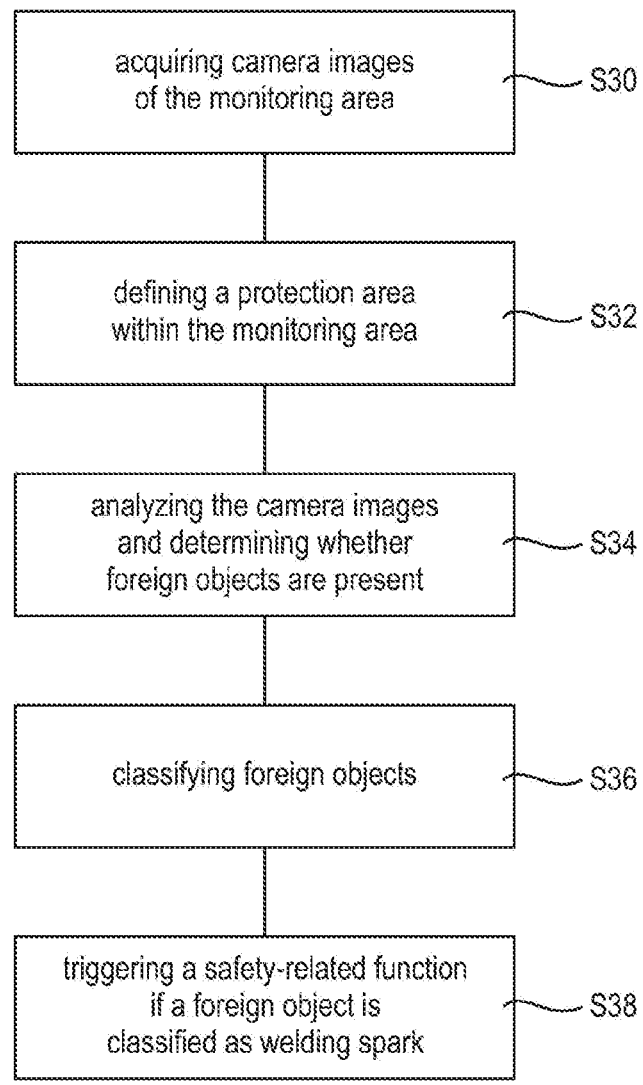
FIG. 10 shows a simplified flow chart to explain the method according to a further embodiment.

This thus results in two different embodiments of the herein presented method, which are schematically shown in FIGS. 9 and 10.

In the first embodiment of the herein presented method shown in FIG. 9, firstly camera images 62 of the monitoring area 14 are acquired in method step S10. In method step S12, these camera images (raw image material) are then immediately analyzed for foreign objects 53, to determine on the basis of one or more of the above-mentioned characteristic features of welding sparks 52 whether the foreign object 53 is a welding spark 52. This analysis is preferably performed in the entire monitoring area 14, to already filter out all welding sparks 52 from the camera images at the beginning, i.e., not only those which are present in the protection area 36. The welding sparks 52 thus recognized are then replaced in method step S14 in the above-mentioned manner with image data from reference images or temporally preceding camera images, to cover them or erase them from the camera images. In method step S16, the at least one protection area 36 within the monitoring area 14 is then defined as a virtual protection area. It is then analyzed in method step S18 whether foreign objects 53 are located in the protection area 36 or not. Since the classification has already taken place in the first processing steps (method step S12), it is no longer necessary in this case to differentiate between safety-relevant foreign objects 58 and welding sparks 52. In method step S20, the safety-related function is triggered if a foreign object 53 was detected in the preceding method step S18 in the protection area 36.

Alternatively thereto, the welding sparks 52 can also be left in the camera images 62 and it is only analyzed in a downstream processing step whether objects 53 detected in the protection area 36 are welding sparks 52 or safety-relevant foreign objects 58. This second embodiment of the herein presented method is schematically shown in FIG. 10. In this case, in a first method step S30, similarly to in the first variant, the camera images of the monitoring area 14 are generated. In method step S32, the at least one virtual protection area 36 is then defined within the monitoring area 14. In method step S34, the camera images of the camera system 12 are analyzed. In this case, it is sufficient to only analyze the image regions of the protection area 36, to detect whether a foreign object 53 is present in the protection area or has penetrated therein. In method step S36, the classification of the foreign objects 53 detected in method step S34 is then performed on the basis of the above-mentioned characteristic features for welding sparks 52, to determine whether the foreign object 53 is a welding spark 52 or not. If a foreign object 53 detected in the protection area 36 was not recognized as a welding spark 52, the safety-related function is then triggered in method step S38.

What is claimed is:

1. A device for safeguarding a monitoring area in which an automatically operating machine is arranged, the device comprising:
   a camera system for monitoring the monitoring area;
   a configuration unit for defining at least one protection area within the monitoring area; and
   an analysis unit for triggering a safety-related function;
   wherein the camera system is configured to generate camera images of the protection area,
   wherein the analysis unit is configured to analyze the generated camera images to determine whether a foreign object is present in the protection area or about to penetrate into the protection area, wherein, if such a foreign object is determined to be present in the protection area or about to penetrate into the protection area, the analysis unit classifies said foreign object based on the generated camera
   images, so as to determine on the basis of one or more features characteristic of welding sparks whether the foreign object is a welding spark, and
   wherein the analysis unit is configured to trigger the safety-related function if the foreign object has not been recognized as a welding spark.

2. The device as claimed in claim 1, further comprising an image correction unit which is configured to replace one or more image regions in the generated camera images if the foreign object is recognized as a welding spark.

3. The device as claimed in claim 2, wherein the image correction unit is configured to replace said one or more image regions in the generated camera images with corresponding image data of temporally preceding camera images.

4. The device as claimed in claim 1, wherein the analysis unit is configured to determine grayscale values of a plurality of pixels of the generated camera images, wherein the analysis unit is furthermore configured to compare said grayscale values to a grayscale threshold value, and wherein the analysis unit is configured to determine based on said comparison whether the foreign object is a welding spark.

5. The device as claimed in claim 1, wherein the analysis unit is configured to determine based the generated camera images a speed of the foreign object, wherein the analysis unit is furthermore configured to compare the speed of the foreign object to a speed threshold value, and wherein the analysis unit is configured to determine based on said comparison whether the foreign object is a welding spark.

6. The device as claimed in claim 5, wherein the analysis unit is configured to detect based on the generated camera images a distance of the foreign object to the camera system, and wherein the analysis unit is configured to determine the speed of the foreign object based on an illumination time of the camera system, the detected distance of the foreign object to the camera system, and a quantity of pixels that are occupied by the foreign object within the generated camera images.

7. The device as claimed in claim 1, wherein the analysis unit is configured to determine a spatial distribution of grayscale values in an image region of at least one of the generated camera images if a foreign object is determined to be in said image region, and wherein the analysis unit is configured to determine based on the spatial distribution of grayscale values whether the foreign object is a welding spark.

8. The device as claimed in claim 7, wherein the analysis unit is configured to determine based on the spatial distribution of grayscale values a gradient of the grayscale values in said image region in order to determine whether the foreign object is a welding spark.

9. The device as claimed in claim 8, wherein the analysis unit is configured to identify the foreign object as a welding spark if the gradient of the grayscale values in said image region includes an exponential or nearly exponential decay of the grayscale values.

10. The device as claimed in claim 8, wherein the analysis unit is furthermore configured to estimate a size of the foreign object based on the spatial distribution of grayscale values, and wherein the analysis unit is configured to determine based on the gradient of the grayscale values in said image region and based on the estimated size whether the foreign object is a welding spark.

11. The device as claimed in claim 8, wherein the analysis unit is furthermore configured to estimate a shape of the foreign object based on the spatial distribution of grayscale values, and wherein the analysis unit is configured to determine based on the gradient of the grayscale values in said image region and based on the estimated shape whether the foreign object is a welding spark.

12. The device as claimed in claim 8, wherein the analysis unit is furthermore configured to estimate a movement direction of the foreign object based on the spatial distribution of the grayscale values, and wherein the analysis unit is configured to determine based on the gradient of the grayscale values in said image region and based on the estimated movement direction whether the foreign object is a welding spark.

13. The device as claimed in claim 8, wherein the analysis unit is furthermore configured to estimate a location of origin of the foreign object based on the spatial distribution of the grayscale values, and wherein the analysis unit is configured to determine based on the gradient of the grayscale values in said image region and based on the estimated location of origin whether the foreign object is a welding spark.

14. The device as claimed in claim 8, wherein the analysis unit is furthermore configured to estimate at least two of a size, a shape, a movement direction, and a location of origin of the foreign object based on the spatial distribution of grayscale values, and wherein the analysis unit is configured to determine based on the gradient of the grayscale values in said image region and based on the at least two of the size, the shape, the movement direction, and the location of origin of the foreign object whether the foreign object is a welding spark.

15. The device as claimed in claim 7, wherein the analysis unit is configured to generate a skeleton based on the spatial distribution of grayscale values and by means of a skeletonizing technique, wherein for generating said skeleton a chain of adjacent pixels having grayscale values greater than a grayscale threshold value is determined in at least one of the generated camera images, wherein the analysis unit is furthermore configured to determine a contour of the foreign object based on the skeleton, and wherein the analysis unit is configured to determine based on the determined contour whether the foreign object is a welding spark.

16. The device as claimed in claim 15, wherein the analysis unit is configured to combine the grayscale values of adjacent pixels into groups for generating said skeleton.

17. The device as claimed in claim 1, wherein the analysis unit is configured to compare temporally successive camera images to one another.

18. The device as claimed in claim 1, wherein the camera system is a multichannel-redundant, multi-ocular camera system, which is configured to determine a distance value that is representative of a spatial location of the foreign object, wherein the distance value is determined by a runtime measurement method and/or by a stereoscopic comparison of two simultaneous camera images.

19. A method for safeguarding a monitoring area in which an automatically operating machine is arranged, having the following steps:
    monitoring the monitoring area using a camera system,
    defining at least one protection area within the monitoring area,
    analyzing camera images provided by the camera system of the protection area to detect whether a foreign object is present in the protection area or penetrates into the protection area,
    classifying the foreign object based on the camera images if such a foreign object is determined to be present in the protection area or about to penetrate into the protection area, so as to determine on the basis of one or more features characteristic of welding sparks whether the foreign object is a welding spark, and
    triggering a safety-related function if the foreign object has not been recognized as a welding spark.

20. A non-transitory computer readable storage medium encoded with a computer program product which, when executed by a computer processor in a device for safeguarding a monitoring area in which an automatically operating machine is arranged, performs the operations comprising:
    controlling a camera system to monitor the monitoring area,
    defining at least one protection area within the monitoring area,
    analyzing camera images provided by the camera system of the protection area to detect whether a foreign object is present in the protection area or penetrates into the protection area,
    classifying the foreign object based on the camera images if such a foreign object is determined to be present in the protection area or about to penetrate into the protection area, so as to determine on the basis of one or more features characteristic of welding sparks whether the foreign object is a welding spark,
    triggering a safety-related function if the foreign object has not been recognized as a welding spark.

* * * * *